June 3, 1952 G. P. REILLY 2,599,198

SOUND REGULATOR FOR TELEPHONE RINGERS

Filed Sept. 14, 1950

INVENTOR.

GORDON P. REILLY

BY Howard J. Whelan.

ATTORNEY

Patented June 3, 1952 2,599,198

UNITED STATES PATENT OFFICE 2,599,198

SOUND REGULATOR FOR TELEPHONE RINGERS

Gordon P. Reilly, Catonsville, Md., assignor of fifty per cent to Leona M. Meckel, Baltimore, Md.

Application September 14, 1950, Serial No. 184,735

2 Claims. (Cl. 177—7)

This invention relates to telephone equipment and more particularly to the signal alarm structure used in connection therewith, and with similar apparatus.

In the conventional bell structure of a telephone set used for signalling the subscriber or user of a particular set, the bell is positioned in a stationary location in or outside of the housing used to enclose the coils and incidental electrical and mechanical parts. In this position the bell is set to ring at a predetermined audibility and retain it. However since conditions vary considerably, there is need for a control of the audibility and preferably one that may be adjusted by the subscriber or user himself. This invention provides for such control by providing means for adjusting the positions of the signalling components so the signal can be varied in intensity to suit the user by turning a knob conveniently placed on the set.

It is therefore an object of this invention to provide a new and improved signalling structure for a telephone set or similar apparatus that will avoid some of the objections and limitations of the prior art.

Another object of the invention is to provide a new and improved signalling structure capable of adjustment to vary the intensity of the signalling thereof.

A further object of this invention is to provide a new and improved signalling structure for electrical transmission systems that can be readily adjusted to control its attentional conspicuity.

An additional object of the invention is to provide a new and improved signalling structure for electrical transmission systems that will be simple in construction, easy to operate and economical to make and use. Other objects will become apparent as the invention is more fully described.

For a better understanding of the invention, and the objects thereof reference is made to the accompanying drawings. These drawings in connection with the following description outline a particular form of the invention by way of example, not of limitation, while the claims emphasize the scope of the invention.

In the drawings.

Similar reference numerals pertain to the same parts throughout the drawings.

Figure 1:
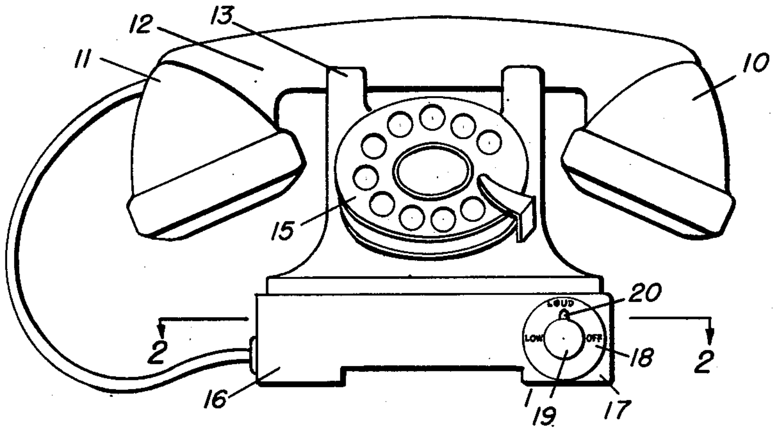
Figure 1 is a front elevational view of a telephone set with a signalling structure embodying this invention.
Figures 2, 3:
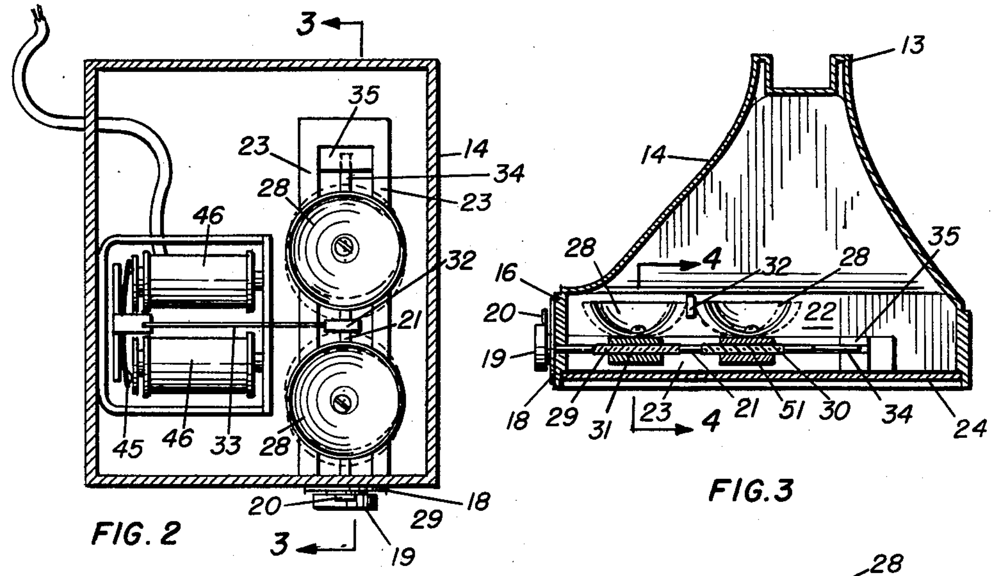
Figure 2 is a sectional view taken on line 2—2 of Figure 1.
Figure 3 is a sectional view taken on line 3—3 of Figure 2.
Figure 4:
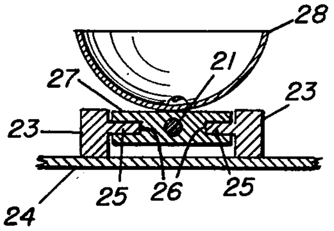
Figure 4 is a sectional view taken on line 4—4 of Figure 2.

In Figure 1 is shown a telephone desk set of the conventional design commonly employed at the present time. It consists of a hand assembly of transmitter 10, and receiver 11 joined together as a unit by a tubular handlepiece 12 resting in the saddle 13 on a housing base 14. The base has a dial mechanism 15 on one of its faces and the lower portion 16 is square in contour and rises at right angles to the horizontal surface on which it is normally rested. The lower portion 16 has a register 17 on which items 18 are embossed to mark off various positions of the signalling structure adjusting mechanism 22 as its knob 19 is turned by the user's hand and aligns the pointer 20 in front of them. The knob and pointer are mounted on the projecting portion of a shaft 21 that extends into the housing 14 and operates the mechanism 22.

The mechanism 22 comprises a pair of parallel and spaced guide bars 23 that are fastened by screws or other suitable means to the bottom 24 of the base 14. Longitudinal projections 25 run in the lateral faces, parallel to each other, in these bars, and serve as guides one which the side grooves 26 can travel. The grooves 26 are in the side walls of the blocks 27 which carry bells 28 on their upper faces. The blocks fit in between the guide bars and run easily on the projections as described. The blocks are moved rectilinearly by the rotation of the shaft 21, which during its rotation revolves so that the screw threads 29 and 30 will actuate in threaded passages 31 and 51 in the central portion of the blocks. The threads 29, and 30 are left and right hand, respectively, so that when rotated in one direction will move the blocks apart and when rotated in the opposite direction will bring them closer to one another. As the blocks are moved apart they make the distance greater in between the bells 28 so that the hammer 32 on its oscillating arm 33 of a telephone bell assembly will have to swing through a longer arc and its intensity of hit, lessened. If the bells are brought closer they will strike harder and louder until a point is reached where the hammer will be stopped completely. Thus by varying the distance in between the bells, their operating tone and loudness can be varied considerably. The shaft 21 is of course mounted in the housing 14 so it will be stationary longitudinally, but is rotatable on its axis. The end portion 34 of the shaft is journalled in the socket 35 mounted on the housing wall 16.

Figure 5:
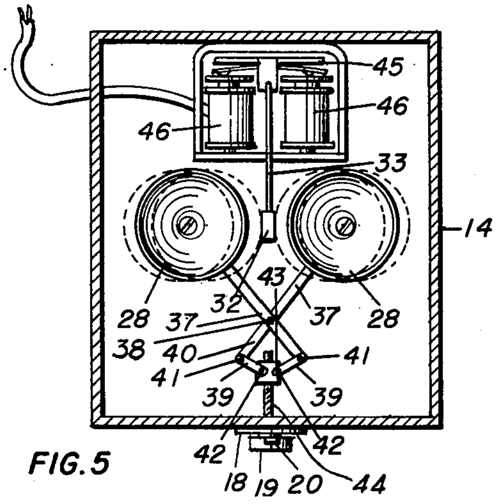
Figure 5 is a modified form of signalling structure in plan.

In the modified construction shown in Figure 5 the bells 28 are supported on the flanges of a pair of arms 37 pivoted in lazy tong fashion in equal lengths on the stationary pin 38, so that the operating arms 40 can actuate them uniformly. The arms 40 are connected by the outer portions of toggle members 39 at their ends by pins 41 so each can freely operate. The inner portions of the toggle members 39 are bifurcated at 42 to straddle a rectilinearly movable bushing 43 on a screw threaded shaft 44. The shaft 44 is stationary in the housing and when rotated by its knob, as in the original form, it will move the bushing 43 and open or close the toggle members 39, operating arms 40, the arms 37 and the bells 28 to suit. The hammer 32 on its arm 33 has an armature 45 attracted vibratingly by coils 46 in a conventional manner in both forms, to make the bells ring. The distance between the bells is variable to control the intensity of the signal made by the hammer striking them. The parts are held in the housing in any suitable manner, whether shown or not.

While several forms of the invention are shown in the drawings, it is not desired to limit this application to such specific forms or in any other way otherwise than limited by the scope of the appended claims, as it is appreciated that other constructions could be made using the same principles and coming within the scope of said claims.

Having thus described the invention, what is claimed is:

1. A signalling structure for a telephone set and circuit comprising in combination, a set of signal bells mounted on the set, and electrically operated means for ringing said bells connected with the circuit of said set, and means for varying the distance between the bells to vary the audible intensity thereof during the ringing, said last mentioned means including means for movably supporting said bells and left and right hand screw threaded means extending outside of the set for moving the bells predetermined distances apart for producing said variation in intensity.

2. A signalling structure for a telephone set and circuit comprising in combination, a set of signal bells mounted on the set, a electrically operated means for ringing said bells connected with the circuit of said set, and means for varying the distance between the bells to vary the audible intensity thereof during the ringing, said last mentioned means including means for movably supporting said bells and left and right hand screw threaded means extending outside of the set for moving the bells predetermined distances apart for producing said variation in intensity, and supports on the last mentioned means for holding the bells so that they will travel in predetermined directions.

GORDON P. REILLY.

REFERENCES CITED

The following references are of record in the file of this patent:

UNITED STATES PATENTS

| Number | Name | Date |
|---|---|---|
| 1,697,057 | Edwards | Jan. 1, 1929 |
| 2,110,380 | Lohr | Mar. 8, 1938 |
| 2,151,726 | Allen | Mar. 28 1939 |
| 2,317,665 | Bredehoft | Apr. 27, 1943 |
| 2,468,474 | Whidden | Apr. 26, 1949 |
| 2,532,133 | Whidden | Nov. 28, 1950 |